US005638156A

United States Patent [19]

Dehli

[11] Patent Number: 5,638,156

[45] Date of Patent: Jun. 10, 1997

[54] SEQUENTIAL DISPLAY MOSAIC FABRICATION FIXTURE AND METHOD OF MAKING MOSAICS

[75] Inventor: Hans J. Dehli, Dana Point, Calif.

[73] Assignee: Admotion Corporation, Irvine, Calif.

[21] Appl. No.: 412,121

[22] Filed: Mar. 28, 1995

[51] Int. Cl.$^6$ .................................................. G03B 27/58

[52] U.S. Cl. ................................................ 355/72; 355/40

[58] Field of Search ............................... 355/72, 125, 77, 355/40, 53

[56] References Cited

U.S. PATENT DOCUMENTS

| | | | |
|---|---|---|---|
| 1,413,406 | 4/1922 | Huebner et al. | 355/72 |
| 2,605,675 | 8/1952 | Mourfield | 355/72 |
| 2,763,182 | 9/1956 | Urban et al. | 355/72 |
| 3,082,560 | 3/1963 | Elvestrom | 355/72 |
| 3,314,179 | 4/1967 | Leach | 355/72 |
| 3,635,560 | 1/1972 | Hulen | 355/86 |
| 3,684,370 | 8/1972 | Yin | 355/71 |
| 3,742,631 | 7/1973 | Hasala | 40/106.53 |
| 3,862,504 | 1/1975 | Ringelheim et al. | 40/106.53 |
| 3,918,185 | 11/1975 | Hasala | 40/106.53 |
| 3,927,942 | 12/1975 | Byers | 355/84 |
| 4,105,328 | 8/1978 | Wasson et al. | 355/78 |
| 4,118,879 | 10/1978 | Simon | 40/437 |
| 4,142,794 | 3/1979 | Trump | 355/92 |
| 4,159,176 | 6/1979 | De Masi | 355/79 |
| 4,358,198 | 11/1982 | Moriyama et al. | 355/53 |
| 4,864,361 | 9/1989 | Amao et al. | 355/53 |
| 4,878,086 | 10/1989 | Isohata et al. | 355/77 |
| 4,897,802 | 1/1990 | Atkinson et al. | 364/518 |

*Primary Examiner*—Arthur T. Grimley
*Assistant Examiner*—David A. Lane
*Attorney, Agent, or Firm*—Fulwider Patton Lee & Utecht, LLP

[57] ABSTRACT

An exposure system for creating a single frame transparency having an enlarger rack with a transparency fixture including a light obscuring exposure mask and a multi axial table for relative movement therebetween during an exposure process which results in a single transparency having four independent images, each of the images having spaced apart groups of pixels interlaced with the groups of pixels from each of the other images, each of the images being selectable for projection by a movable grid mask. A method for preparing multiple images from a single transparency is also disclosed. The transparency is formed by sequentially exposing portions of a sheet of film overlayed by a gridlike mask, and correspondingly repositioning the film after each exposure such that a new interlaced area of film is exposed.

26 Claims, 6 Drawing Sheets

SEQUENTIAL DISPLAY MOSAIC FABRICATION FIXTURE AND METHOD OF MAKING MOSAICS

BACKGROUND OF THE INVENTION

1. Field of the Invention

The present invention relates to sequential image display systems and more particularly to an exposure fixture and method for creating mosaic transparencies used for sequentially exhibiting multiple images in an advertising display.

2. Description of the Prior Art

Point of sale advertising is a commonly used tool for product exposure wherein static banners or video displays convey images of a particular product message to the shopping public, usually inside a store where the product is regularly sold. A unique compromise between banners and video marketing in this field involves the use of compact advertising devices which sequentially display several different images. Employing a single transparent mosaic containing multiple images interlaced therein, individual images are viewable for set periods of time from a single back lighted screen. An overlay mask blocks the back lighting from illuminating areas of the transparency sheet associated with images of other subjects during each sequential viewing of a subject selected from the screen. Such devices provide advertisers with a high degree of flexibility for a great variety of exposure of different images within the limitations of a relatively confined space which may be available at such a location typically associated with high concentrations of potential purchasers, such as at a shopping mall or the like.

Transparencies used with sequential image display systems often include a translucent image screen comprising a mosaic of discrete images formed by relatively small interlaced translucent pixels or window segments which are arranged in uniform groups. Pixels corresponding to a discrete image occupy the same relative position in each group and bear corresponding relative magnitudes of translucency. A mosaic of this type is disclosed in U.S. Pat. No. 4,897,802 to Atkinson et al, assigned to the assignee of the rights in the instant application.

A variety of exposure fixtures and methods have been disclosed for making single sheet negative transparencies containing multiple images for subsequent individual display in a selected sequence. Commonly referred to as "step and repeat" registration systems, some of these devices provide a positioning fixture for multiple image exposures onto a single sheet of film. One such device, shown in U.S. Pat. No. 4,142,794 to Trump, discloses a stage upon which photosensitive film is mounted. The stage is moveable along a horizontal plane defined by two perpendicular drives, and enclosed within a glass covered housing. Elevated above the stage are two parallely spaced tape lengths securing an image bearing negative. A light source positioned above the secured negative provides a light beam capable of projecting the image onto a particular section of the film, with the remainder of the film obscured from the light. Incrementally re-positioning the film after each successive exposure is a stepping motor and a control circuit, resulting in an exposed sheet of film containing separated multiple images.

Step and repeat exposure methods associated with the type of fixture described above generally begin by exposing a particular negative onto an unmasked portion of film. Next, the "step and repeat" fixture is utilized in an effort to precisely move either the film or a mask to the corresponding location for the next image to be exposed. The process repeats as desired until the film is completely exposed. Although offering advantages for close tolerance positioning and adequate to expose multiple images onto single sheets of film, the disclosed methods generally do not create images which are interlaced among other images throughout the film surface for efficient display of selected ones of such images for set periods of time. Rather, each print is set onto its own particular section of film, often resulting in only rows and columns of picture segments.

The Atkinson patent overcomes the "interlacing" problem above by providing a specially masked fixture. The fixture is part of an exposure system, comprising a camera and a framework for mounting a projector. A mirrored, folded light path is provided through the framework for columnating the light to obtain full size pixels. This mirrored path is necessary to minimize divergence of the projected light from the light source, often causing shadowing and oversizing of exposed pixels due to the relatively small sizing of the mask apertures through which the projected light passes. The system further includes a mask capable of obscuring and passing preselected segments of light, and a moveable vacuum mount with film mounted thereon. Corresponding to the pixel spacing, the mount is intended to be moveable 0.013 inches right, left, up and down.

The corresponding method of fabrication used with the Atkinson fixture begins by supplying an image bearing negative along with a full size sheet of film. The fixture mask allows "segments" of the overall image to be exposed onto the film, while still preserving the overall image likeness. Projecting the image onto the masked film initiates the exposure process thus exposing a portion of the transparency with the image. Next, a new negative is supplied and the process repeated. After four such exposures, the resulting transparency forms a mosaic having groups of interlaced pixels corresponding to the four discrete images. Although offering some benefits in that the Atkinson fixture and method offers a movable mount and a light obscuring mask to interlace the images, due to the fact that the device is large and relatively complex because of the mirrored path, it has not gained general commercial acceptance.

A further limitation often affecting prior art mosaic fixtures and methods involves a phenomena commonly referred to as "white flash", which often compromises the quality of the finished product. Representing bright border streaks adjacent to opaque pixel boundary lines, "white flash" detracts from the quality of the image presentation during an image transition, causing attention to the bright aberrations momentarily observable on the display viewing surface. Careful exposure techniques using the hereinabove methods may result in a transparency free from "white flash", however, such techniques often require exact alignment between the exposure mask and film to prevent exposure voids between pixels. Such time consuming care creates a more costly finished product and renders the quality of such product highly dependent on the care and skill exercised by the operator.

Thus the need exists for a straightforward and efficient display mosaic fabrication fixture having the capability of controllably and precisely relatively positioning a mask relative to a sheet of film for creating a display mosaic image characterized by individual image pixels interspersed with pixels of other images over the face of the sheet of film for subsequent selected illumination of the selected pixels of the respective images. Additionally, the need exists for a more efficient method for creating mosaic transparencies free from "white flash".

SUMMARY OF THE INVENTION

The present invention is characterized by the preparation of a mosaic transparency of a uniform pattern of equivalently sized pixels defining window elements, such window elements being arranged in uniform groups, each group having respective window elements in corresponding locations therein. The window elements in corresponding locations in each group cooperate to define discrete patterns for video display.

The fixture used to create the mosaic transparencies described above generally includes a polygonal base supporting a multi axis suspension system having a floating platen. The platen includes a film support surface for securing a sheet of photographic film thereon. Overlaying the platen is a gridlike mask having defined apertures for passing light therethrough. A drive mechanism rotatably fixed to the base and coupled to the platen drives the platen through a predetermined path while a base mounted control device precisely governs movement of the platen through means of an indexing mechanism.

The mosaic is fabricated by sequentially exposing images to the unexposed areas of film, as defined by the gridlike mask. Subsequent to each exposure, the platen is repositioned a predetermined distance, unveiling a new substantially unexposed section of film for the exposure of light thereto. Succeeding exposed pixels are positioned in a slightly overlapping fashion to cause a double exposure border between pixels, thereby minimizing transparent pixel borders which subsequently cause "white flash". The resulting transparency may be used in conjunction with a display apparatus to sequentially display the individual discrete images.

Other objects and features of the invention will become apparent from consideration of the following description taken in connection with the accompanying drawings.

DETAILED DESCRIPTION OF THE PREFERRED EMBODIMENT

Figure 1:
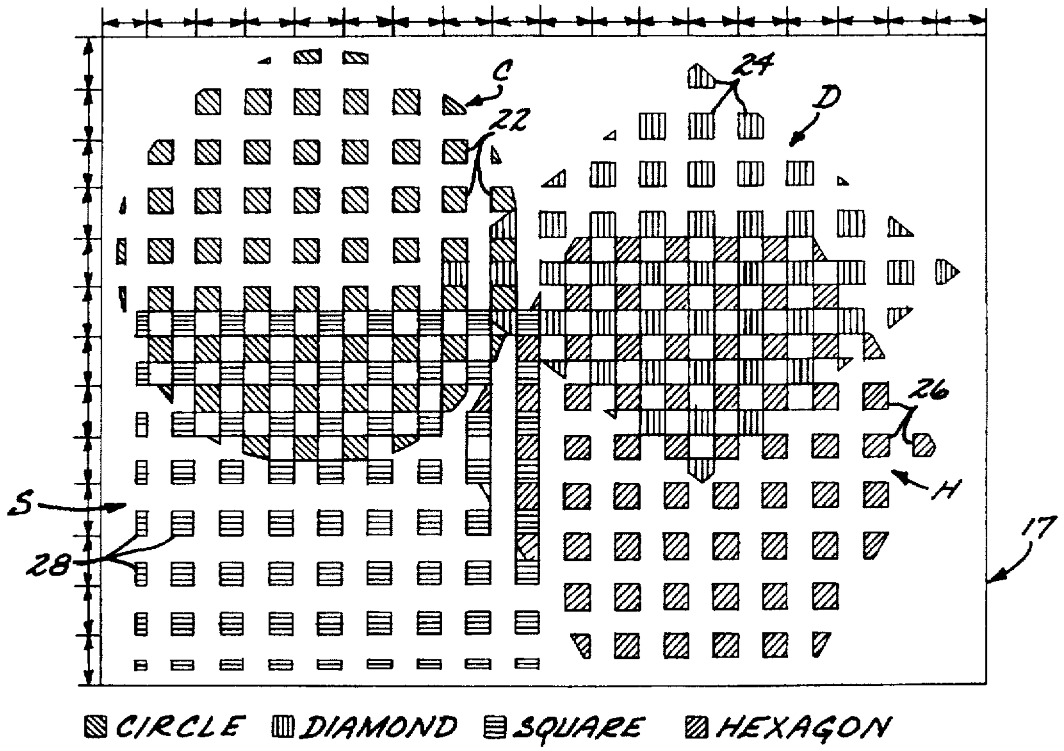
FIG. 1 is a top plan view of a mosaic transparency fabricated by the method of the present invention.

As shown in the drawings for purposes of illustration, display image mosaics 17 (FIG. 1) of the present invention generally take the form of film negatives exposed in a manner such that four independent patterns are formed on each negative. Tiny pixels 18 (FIG. 2) make up each pattern and are uniformly interspersed in repeated patterns across the surface of the negative. Individual pixels of each of the patterns lie in the same relative position within the respective pattern to establish predicted positions for each of the pixels 20. The groups are arranged such that when an aligned mask obscures three of the four pixels of each group, the remaining pixels of the respective groups cooperate to display a first composite image. A slight controlled movement of the mask will expose selected corresponding previously hidden pixels while blocking the pixels of the three remaining images to thereby present a composite of that set of pixels to exhibit a second composite image. This procedure may be repeated for the third and fourth pixels of each group to thereby exhibit composite third and fourth images.

Figure 2:
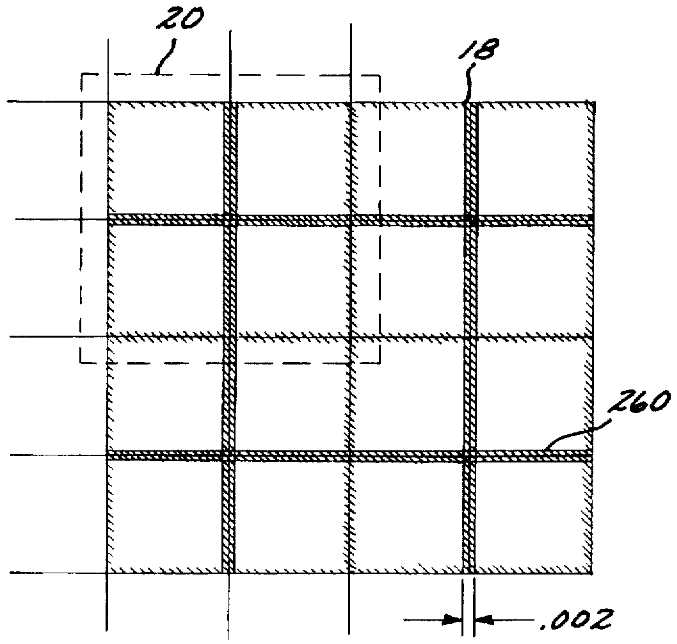
FIG. 2 is a diagrammatic magnified partial view of the mosaic transparency shown in FIG. 1.

Referring to FIG. 1, mosaic transparencies of the present invention include an interlaced pattern of groups of pixels 22, 24, 26 and 28 which, for example, cooperate together in defining discrete designs of a circle, diamond, hexagon, and square, generally designated C, D, H and S, respectively. Taking advantage of diverging light radiating outwardly through apertures toward the viewer, the figures will be perceived individually as discrete, continuous shapes. This stems from the fact that light from a source located closely behind the screen defining such apertures radiates in a divergent fashion through the apertures thus projecting divergently toward the viewer and tending to obscure the lines formed between such apertures.

Fabrication systems employed to create similarly formed pictures have often comprised "step and repeat" types of devices which are typically capable of repetitively creating multiple duplicate images by re-registering a projected image on a single piece of film. A previously disclosed mosaic fabrication system includes a mirrored light pathway formed into an exposure framework. A mask is provided to pass light only through precisely spaced pixel apertures to expose correspondingly positioned pixel areas on a sheet of film positioned underneath. The system further includes a fixture having a moveable mount capable of controllably repositioning a sheet of film mounted thereon to controllably position other selected pixel areas in confronting relation with the respective pixel apertures such that different interspersed sections of the film can be separately exposed, enabling fabrication of the mosaic described above.

Figure 3:
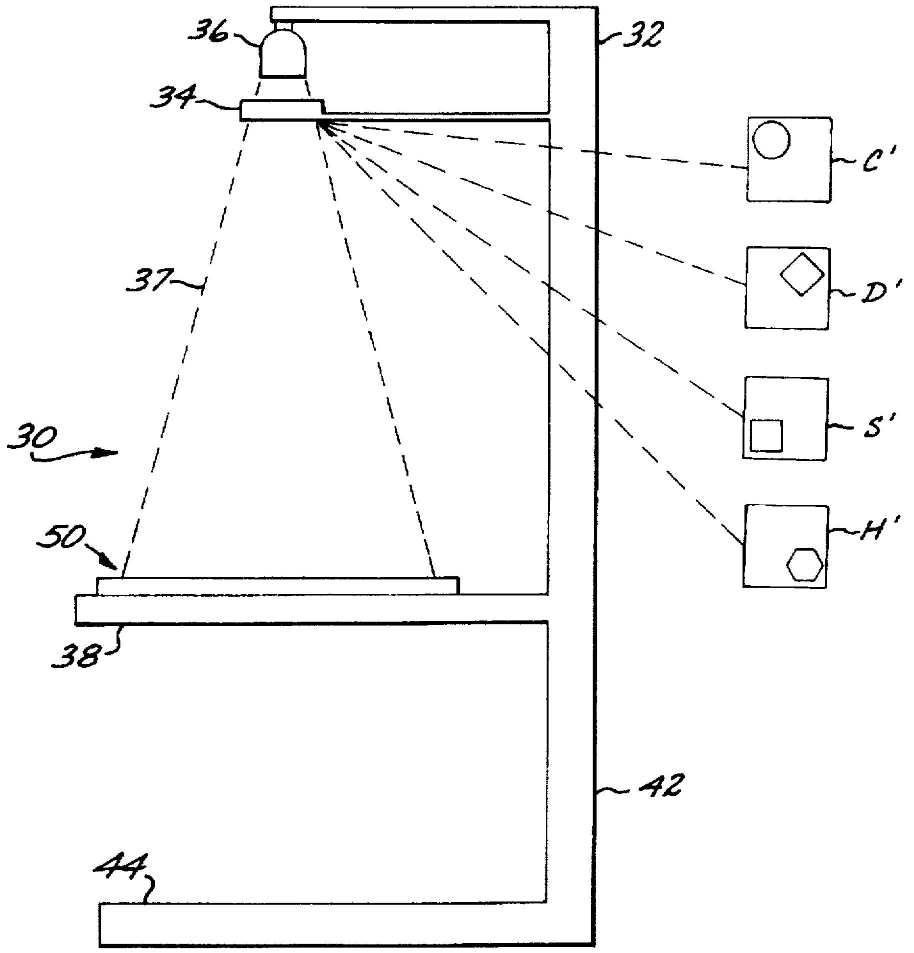
FIG. 3 is a side elevational view in reduced scale of an exposure device for exposing a negative to be employed in the method of the present invention to produce the mosaic shown in FIG. 1.

With reference to FIG. 3, the mosaic transparency fixture of the present invention may be incorporated in a standard photograph enlarger system, generally designated 30, which includes an enlarger rack 32 having a negative holder 34 to sequentially secure negatives C', D', S' and H' and interposed between an elevated light source 36 and a horizontal enlarger table 38. Supporting the entire system is an upstanding vertical post 42 mounted upon a horizontal base 44. The negative holder extends outwardly from the vertical post such that when the light is activated, the resulting beam 37 projects downward onto the enlarger table, substantially parallel to the vertical post in a columnated fashion.

Figure 4:
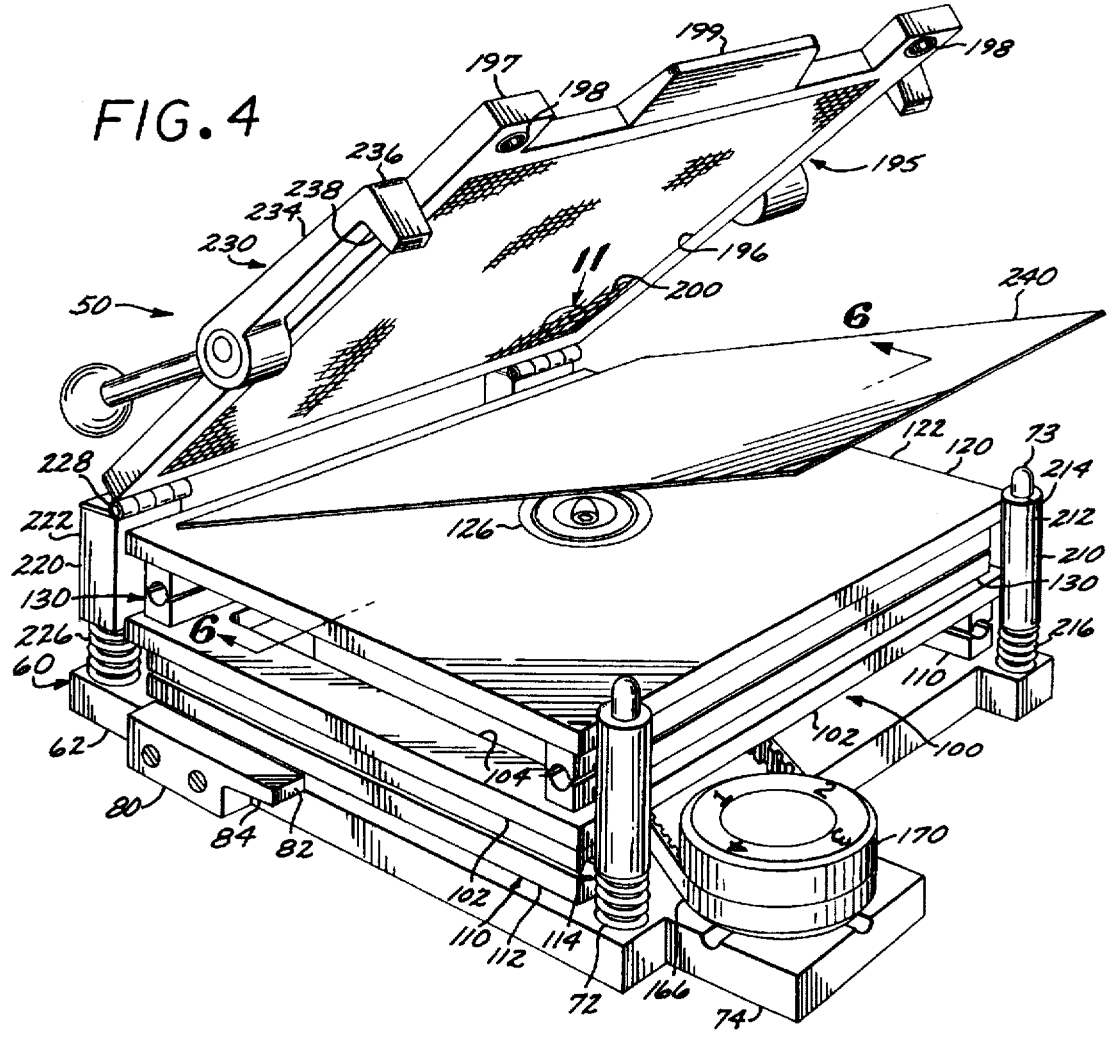
FIG. 4 is a perspective view, in reduced scale, of a mosaic fixture employed in the method for producing the transparency shown in FIG. 1.
Figure 6:
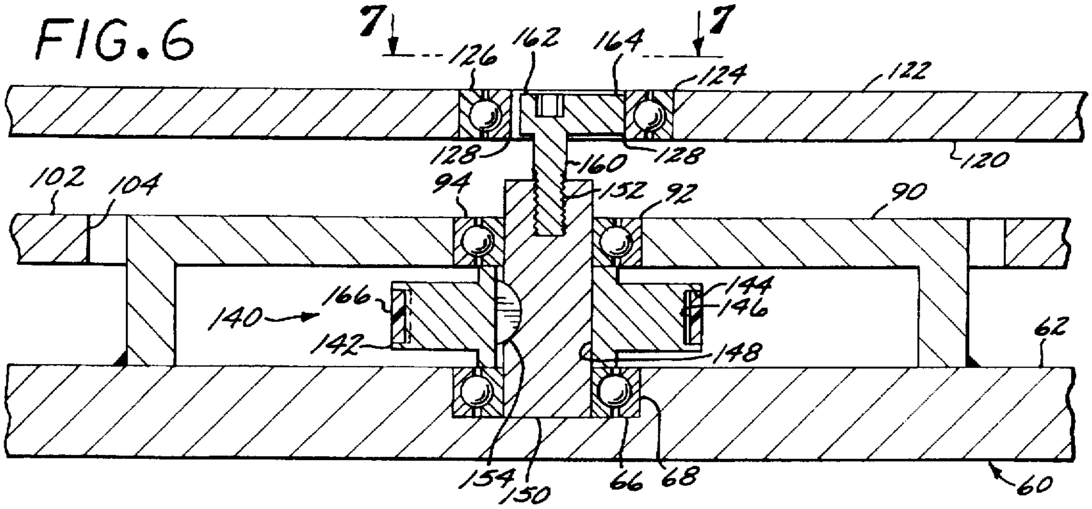
FIG. 6 is a partial view, in enlarged scale, taken along line 6—6 of FIG. 4.

Referring to FIGS. 4 and 6, the present invention includes, generally, a mosaic transparency fixture 50, including a base plate assembly 60 having centrally mounted thereon a bearing housing 90 carrying a drive shaft 150 which orbits an eccentric drive 160 to orbit a drive platen 120 through a platen path. A cover assembly 195 is hingedly carried from the base plate assembly to carry a mask 200 held in fixed relation relative to a photographic film 240 sheet mounted on the drive platen.

With continued reference to FIGS. 4 and 6, the base plate assembly 60 includes a generally square base plate 62 having respective upwardly opening blind bores 64 disposed at the corners thereof (FIG. 5) and centrally formed with a blind bore defining a circular well 66 for nesting a main shaft bearing. Mounted in the respective corner bores are pairs of respective upstanding front and rear carrier posts 72 and 73 to be positioned, respectively, under the respective front corners of the cover and behind the back edge thereof. The plate further includes a laterally disposed, forwardly projecting square tongue defining a handwheel mount 74. The tongue (FIGS. 9 and 10) is centrally formed with a threaded blind bore 76 having upwardly opening horizontally projecting index grooves 78 radiating outwardly therefrom and spaced equidistant from one another to define pockets. Laterally secured to the sides of the base plate 62 are respective keeper blocks 80 formed with forwardly projecting keeper tongues configured on their respective bottom sides with rearwardly and downwardly angled wedge surfaces 84.

Received telescopically over the respective front posts 72 are cylindrical carrier barrels configured on their respective top ends with end walls having respective bores therein for projection therethrough of the top extremities of the respective posts to expose the respective bullet tips 73. Such barrels are biased upwardly to their respective receiving positions by respective coil compression springs interposed between the respective bottom edges of the barrels and the base 60.

Respective carrier blocks 222 are formed with respective downwardly opening blind bores 224 for telescopical receipt over the top ends of the respective rear posts 72. Interposed between the bottom ends of such blocks and the base 60 are respective coil compression springs to bias the blocks resiliently upwardly to a receiving position. The opposite sides of the back edge of the cover 195 are connected to the respective carrier blocks by means of respective hinges 228.

With particular reference to FIG. 6, fixedly mounted centrally on the base plate 62 is a hat shaped bearing housing 90 formed centrally with a through vertical bore 92 for receipt of a ball bearing assembly 94 therein. Such through bore is vertically aligned with said base plate well 66 to axially support rotatable movement of a vertically upstanding main shaft 150 as will be described hereinbelow.

Referring further to FIGS. 4 and 6, interposed between the base plate 62 and the platen 120 and substantially surrounding such bearing housing 90 is a multi axis suspension system 100 having an intermediate frame 102 slidable relative to such base and platen by means of pairs of lower and upper linear bearing assemblies 110 and 130. The intermediate frame 102 is in the form of a horizontal border defining a central clearance opening 104 and freely slidable in any direction due to the action of the orthogonally projecting bearing assemblies 110 and 130. The respective bearing assemblies include pairs of confronting elongated blocks 112 formed with central inwardly opening canals 114 horizontally opposed for enclosing a plurality of steel bearing balls 116 (FIG. 5) to provide for slidable relative movement therebetween. The support platen 120 is in the form of a square aluminum plate and overlays the center frame 102 and includes an upwardly facing planar film support surface 122 and centrally formed with a through bore 124 for receipt of a thrust bearing 126 disposed in general vertical alignment with the drive shaft bearing assembly 94. The inner race of such bearing forms a central opening 128 for press fit receipt of an eccentric drive cam plate 164.

With particular reference to FIG. 6, confined within the bearing housing 90 is a vertically upstanding flywheel assembly 140 carried at its top end in the ball bearing assembly 94 and at its bottom end in a ball bearing assembly 66 nested in the blind bore 68. The flywheel assembly includes a flywheel 142 in the form of a circular pulley including an outwardly opening annular groove 144 formed about the periphery thereof with teeth 146 for engaging a drive belt 166. Centrally formed in the flywheel is a through bore 148 for receiving a bearing shaft 150 carried at its respective top and bottom extremities in the respective inner races of the respective bearing assemblies 94 and 66 and keyed to such pulley by means of key 154.

Figure 7:
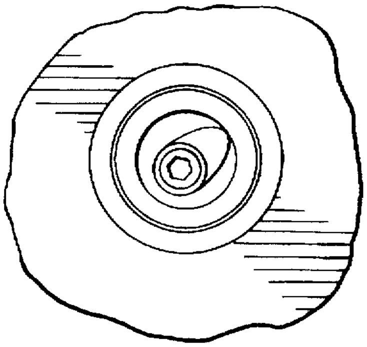
FIG. 7 is a partial, top view taken along line 7—7 of FIG. 6.

Referring to FIGS. 6 and 7, the eccentric cam plate 164 is incorporated in an eccentric assembly drive, generally designated 160, hereinafter referred to as the eccentric, carried on a threaded stud screwed on its lower end into the threaded bore 152 in the drive shaft 150.

Figure 9:
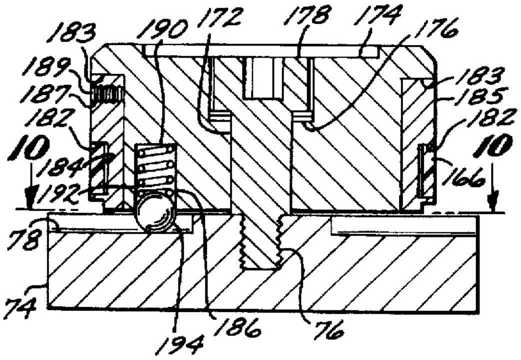
FIG. 9 is a vertical sectional view, in enlarged scale, taken along the line 9—9 of FIG. 5.
Figure 10:
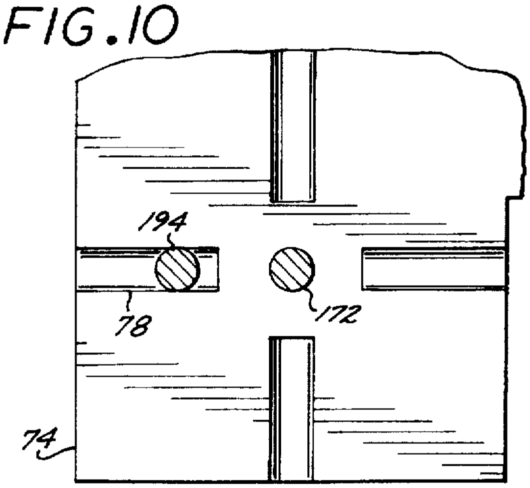
FIG. 10 is a partial horizontal sectional view, in enlarged scale, taken along the line 10—10 of FIG. 9.

Referring to FIGS. 9 and 10, rotatably coupled to the flywheel 142 by means of the drive belt 166 is a circular handwheel 170 rotatably mounted on the handwheel mount 74 by means of the pivot pin 172 and including on its underside an index mechanism 190 for selectively indexing with the respective index grooves 78. With particular reference to FIG. 9, the handwheel 170 is in the form of a rotary dial having a through bore 172 journaled axially with concentric shallow 174 and middle countersinks 176 to accept a pivot pin 178 therein.

Formed into the periphery of the handwheel is an outwardly opening annular guide 183 for nesting a concentric adjustment ring 185. The adjustment ring is complementally formed to fit flush within the guide 183 and includes an annularly formed outwardly opening groove 182 having annular teeth 184 formed therein for engaging the drive belt 166. A threaded through bore 187 is journaled orthogonally into the ring for receipt of a handwheel set screw 189. The handwheel further includes a downwardly opening blind bore 186 formed upwardly into the bottom surface thereof for housing the index mechanism 190. Conveniently adhered to the top of the dial, within the shallow countersink 174, are four position markers labeled "1", "2", "3", and "4", radially spaced 90 degrees apart for indicating relative positions of the platen 120.

The handwheel index mechanism 190 comprises a compression coil spring 192 set within the blind bore 186 and held therein by a spherically formed ball 194 partially received within said bore and disposed in rolling relationship with the handwheel mount 74 to selectively engage the index pockets 78 upon handwheel rotation of a predetermined angle.

Referring to FIG. 4, overlaying the platen film support 122 is the rectangularly formed cover assembly 195 which includes an opaque grid-like mask 200 carried within a metallic frame 196. The frame is formed on its front side with a pair of laterally spaced apart forwardly projecting leveling blocks 197 having vertical bores formed therein for receipt of respective sleeves 198 aligned, when the cover is closed, over the respective front top ends 73 of the posts 72, and having interposed therebetween a forwardly projecting lifting handle 199. Formed into the inner periphery of the frame is a step defining an upwardly facing rectangular shoulder (not shown) for supportive engagement of the marginal edges of a rectangular glass plate (not shown).

Figure 11:
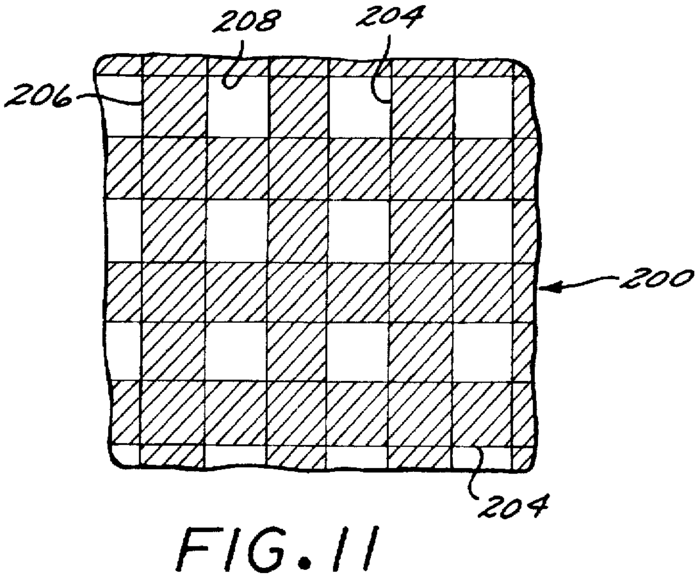
FIG. 11 is a detail view, in enlarged scale, taken from the circle designated 11 in FIG. 4.

With particular reference to FIG. 11, the opaque mask is formed by a grid-like film having an interconnected network of straight line segments 204 cooperating to comprise symmetrically spaced opaque 206 and transparent apertures 208 of a square or other desired shape. The transparent apertures serve to expose a footprint of the light projected therethrough onto a sheet of unexposed photographic film positioned on the platen 120, while the opaque apertures perform a filtering function to block unwanted light. Constructed from a fiber optically produced, high resolution screening grid, the mask may be commercially obtained from (Bychrome Co., Box 1077, Columbus, Ohio, 43216). In practice, the mask is overlayed onto a transparent rectangular plate formed from glass or acrylic for subsequent installation within the upwardly facing shoulder of the cover frame 196.

Figure 5:
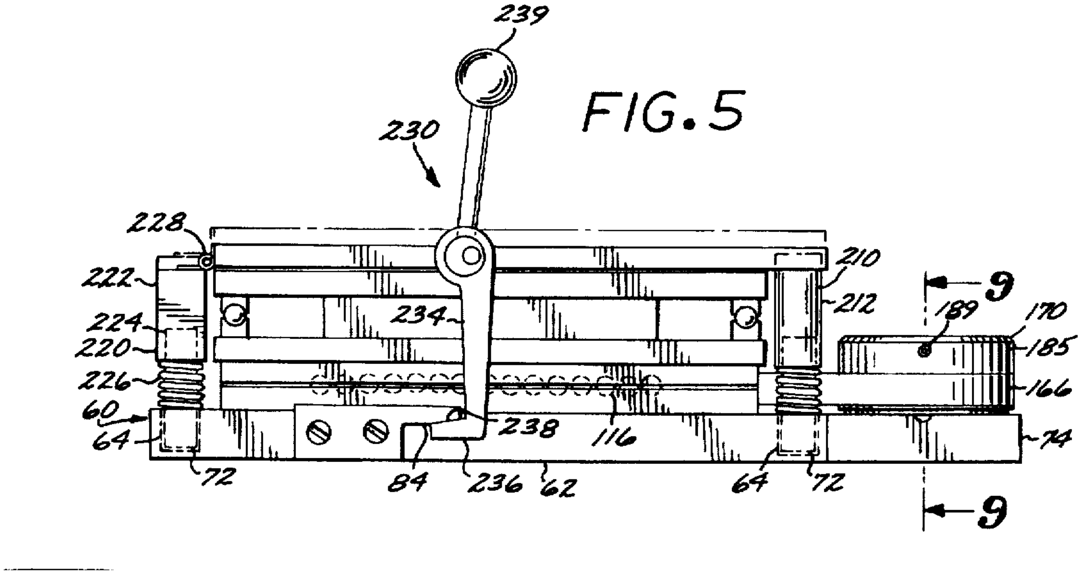
FIG. 5 is a side view of the mosaic fixture shown in FIG. 4 but depicted in a closed configuration.

Referring to FIGS. 4 and 5, mounted pivotally midway along the lateral sides of the cover are respective crank latches, generally designated 230, carried centrally from respective pivot pins and formed on their respective one ends with L-shaped lever arms 234 configured at their respective distal ends with rearwardly turned latch hooks 236 (FIG. 5) configured on their respective top sides with forwardly and upwardly inclined mating edges 238 configured to complementally engage the respective wedge edges 84 of the keepers as such latches are rotated clockwise as shown in FIG. 5. Such latches are formed with upstanding stems topped off by respective hand grip balls 239.

Synchronization of the relationships between the flywheel 142, handwheel 170 and eccentric 160 is required prior to employing the fixture 50 for mosaic fabrication. This is accomplished by first loosening the handwheel set screw 189 thereby unfastening the adjustment ring 185 from the handwheel 170, allowing rotation of the flywheel 140 without corresponding movement of the handwheel. At this point, the platen 120 may be placed into the initial exposure position with the cam clocked to 45° as shown at 252, FIG. 8, by rotating the flywheel accordingly. Once the platen is properly positioned, the handwheel is set such that the indicia "1" lies at 12:00. This is followed by a retightening of the set screw to prevent relative rotational movement between the adjustment ring and the handwheel. Counterclockwise rotation of the handwheel to each successive indexed position results in a 90 degree counterclockwise rotation of the eccentric, causing the platen to orbit, in a fixed orientation, 90 degrees along a circular path having a diameter equal to the width of a pixel.

Orbital movement of the platen 120 is possible due to the inclusion of the perpendicularly placed pairs of linear bearings 110 and 130 permitting two axes of movement. Although the platen itself can slide only along one axis defined by the bearing pair 130 directly supporting it, the intermediate frame 102 is mounted for sliding along the other perpendicular axis. Thus, the platen can, in combination with the center frame, be orbited through a circularly shaped path to displace a film sheet relative to the opaque mask. It will be appreciated that the platen thrust bearing 126 minimizes any torquing forces due to rotation of the eccentric 160, thus allowing the platen to maintain a precise orientation with respect to the opaque mask 200.

In operation, the mosaic transparency fixture of FIG. 4 is mounted upon the exposure table of FIG. 3 such that the fixture platen 120 lies directly beneath the light source 36 of the exposure system 30 and is oriented substantially level. With the light source off and the cover assembly 195 open, a rectangular sheet of unexposed film 240 is placed face up centrally on the fixture platen and secured with tape or an equivalent adhesive. The cover is pivoted forwardly and downwardly to a horizontal overlaying position elevated slightly above the film such that the sleeves 198 of the cover are received over the exposed tips 72 to come to rest on the respective top ends of the carrier barrels. With the cover in this lowered position, it can be manually pressed downwardly toward the platen 120 and the lateral latches 230 rotated clockwise as viewed in FIG. 5 to drive the respective hooks 236 rearwardly to engage the tapered edges 238 of such hooks 236 under the respective wedge surfaces 84 of the keeper members 82. This combined action is effective to push the cover downwardly against the spring biased cover carriers 210 and 222 to thus stabilize the mask in a plane parallel to the plane of the film 240 mounted on the platen 120.

The film securing platen 120 is then positioned for an initial exposure corresponding to Position 1 marked on the handwheel 170 in a 12:00 orientation with respect to the front of the fixture 50. This corresponds to a platen position slightly off centered rearwardly and to the right with respect to the bearing axis centerline.

Referring briefly to FIG. 3, with an initial negative, such as negative C', inserted in the negative holder 34, and the fixture platen 120 initially positioned, the exposure system light source 36 is momentarily actuated to project an outwardly diverging beam of light 37 carrying an image corresponding to the initial negative downwardly onto the mosaic fixture 50. The beam is projected onto the opaque mask 200, which selectively filters out all but a selected portion of the light. The transparent apertures 208 of the mask controllably pass segments of the beam, enabling footprints of the apertures to appear on the film sheet 240. The transparent apertures are formed of a size sufficient to pass respective individual aperture beams of light of sufficient cross section to present respective footprints of such beams on the film having side dimensions approximately 0.002 inches larger than the pixel sides of the finished pixels. Due to the photosensitive nature of the film, the respective footprints of individual aperture beams serve to expose individual mosaic pixels having a degree of exposure corresponding to the coloration of the corresponding area of the initial image on the negative C'.

Following the first initial exposure for position one, the film sheet 240 is repositioned by turning the handwheel 170 counterclockwise until the indexing mechanism 190 engages the next index pocket 78, corresponding to Position 2 of the handwheel being clocked at 12:00. Such rotation of the handwheel correspondingly turns the flywheel 142 which drives the bearing shaft 150 to rotate the eccentric 160. As the cam-like eccentric rotates, it orbits the platen 120 through a quarter sector of a circle as dictated by the degree of eccentricity to translate such platen, and thus the film 240 through the segment of a path defined by the points defining the respective centers of the pixels 282 and 284 shown in FIGS. 12 and 13.

Figure 8:
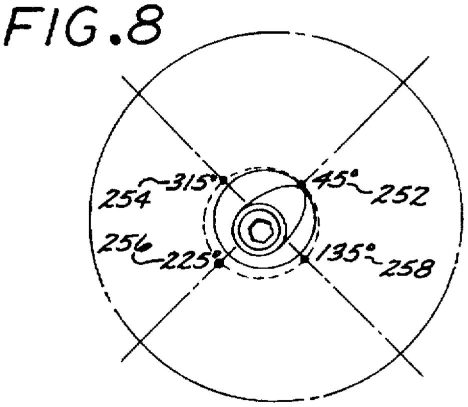
FIG. 8 is a diagrammatic view of an eccentric drive included in the fixture shown in FIG. 7.

Referring to FIG. 8, during a sequenced 360 degree circuit of the eccentric 160, the platen 120 correspondingly stops at four dwell positions, corresponding to the indexed positions of the handwheel 170, radially spaced 90 degrees apart along a circular path 250. With respect to the references illustrated in FIG. 8, position one 252 corresponds to 45 degrees; position two 254 corresponds to 315 degrees; position three 256 corresponds to 225 degrees; and position four 258 corresponds to 135 degrees. It will be appreciated that the eccentric 160 is sufficiently formed to cause such dwell points to transcribe a circle having a diameter equal to the side dimension of a square pixel. As a consequence, the film sheet 240 is sequentially repositioned a distance equal to a pixel side, thus ensuring that no unexposed voids exist between exposed pixels on the film sheet.

As noted above, repositioning of the platen 120 displaces the film sheet 240 relative to the opaque mask 200 a distance equal to a pixel side, thus resulting in the transparent apertures 208 passing footprints onto previously obscured portions of the film. Since the footprints are slightly oversized with respect to the pixels, there will be an overlap (FIG. 2) of the new footprint onto the edge of a previously exposed pixel, thus causing a double exposure therealong. Such overlapping is repeated as subsequent footprints are exposed, resulting in every pixel having a double exposed border 260 (FIG. 2) therearound.

It will be appreciated by those skilled in the art that the double exposed border surrounding each pixel eliminates the problem of "white flash", which results from insufficient exposure of the film sheet. Unexposed boundaries between pixels, common in prior art mosaics, develop into unwanted clear lines which produce detracting visual streaks upon subsequent use in a sequential display mechanism. The present invention is configured to produce double exposed pixel borders, which develop into opaque lines, and are visually undetectable during subsequent display in an appropriate device. However, it is important that high tolerances be maintained with regards to pixel spacing and platen displacement to maximize the effectiveness of this method.

Figure 12:
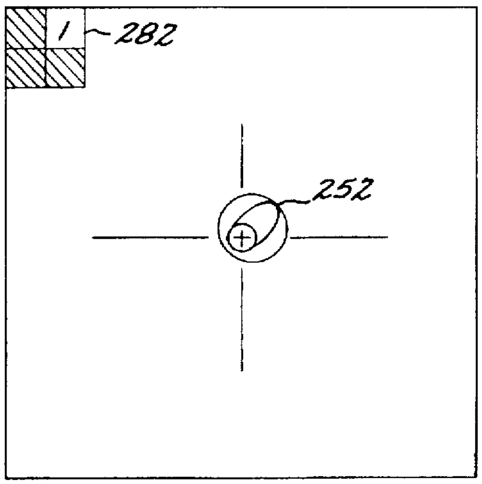
FIGS. 12–15 are diagrammatic views, in reduced scale, depicting various relative positions of the eccentric drive and photographic film included in the fixture shown in FIG. 4.
Figure 16:
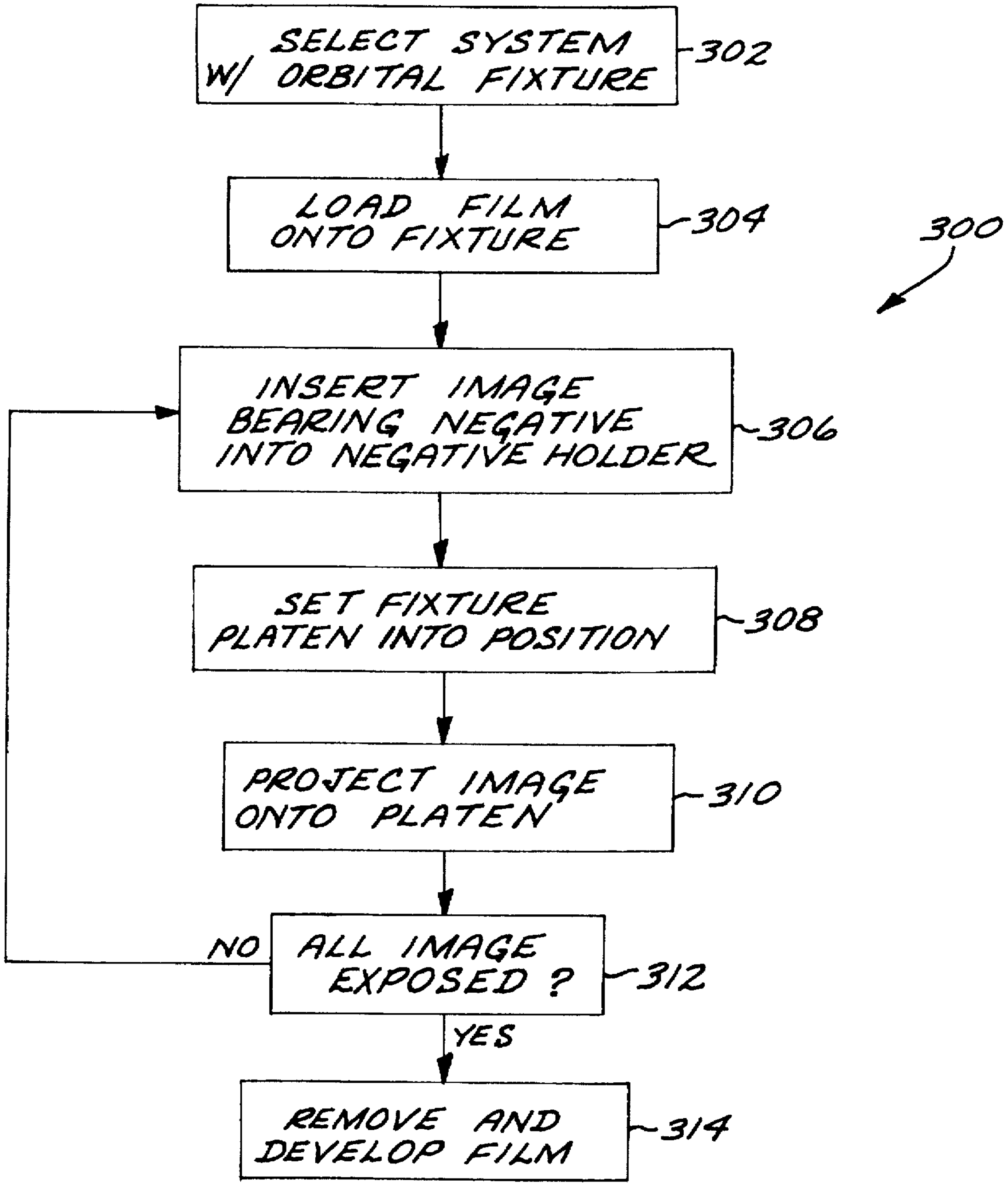
FIG. 16 is a block diagram of a method of the fixture shown in FIG. 4 to make the transparencies shown in FIG. 1.

Referring to FIG. 16, the mosaic transparency of FIG. 1 may be made by selecting the fixture 50, as shown at step 302, and placing it in the exposure system 30 to sequentially expose individual images projected from image bearing negatives onto a photosensitive sheet of film 240. As set forth above, the unexposed film 240 is secured at step 304 to the floating fixture platen 120 and an initial image bearing negative C' placed into the exposure system negative holder 34 at step 306. The fixture platen is then set into the first exposure position 252, (FIG. 12), at step 308, corresponding to the handwheel 170 being set to position "1", thus aligning the pattern of transparent apertures 208 provided by the opaque mask 200 over respective first quadrants 282 of the respective four pixel groupings 20 (FIG. 2) to be exposed onto the film sheet. The initial negative is then momentarily illuminated from behind by the exposure system light source 36 at step 310, resulting in an image being projected downwardly upon the fixture. Due to the patterned transparent aperture spacing provided by the opaque mask, only a portion of the light passes, exposing only the first quadrant as shown in FIG. 12.

Figure 13:
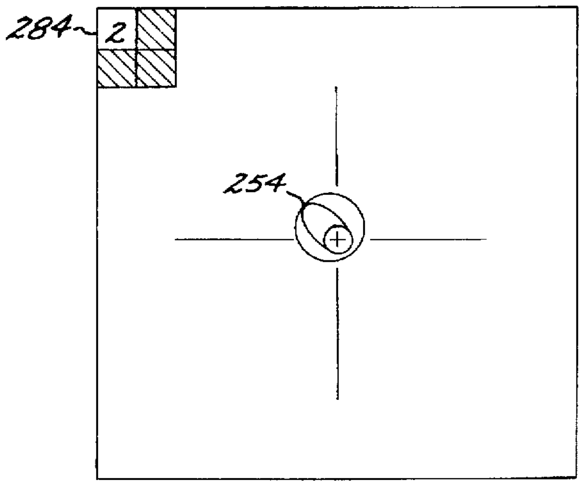
Figure 14:
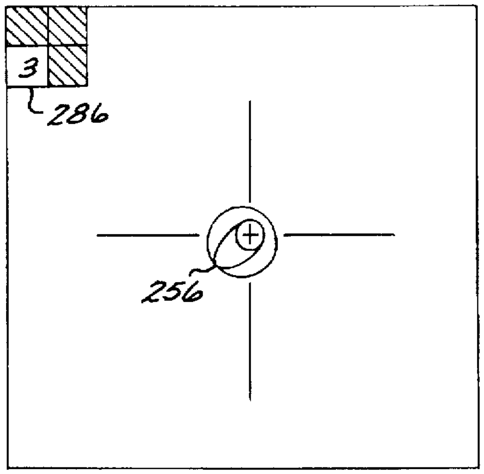
Figure 15:
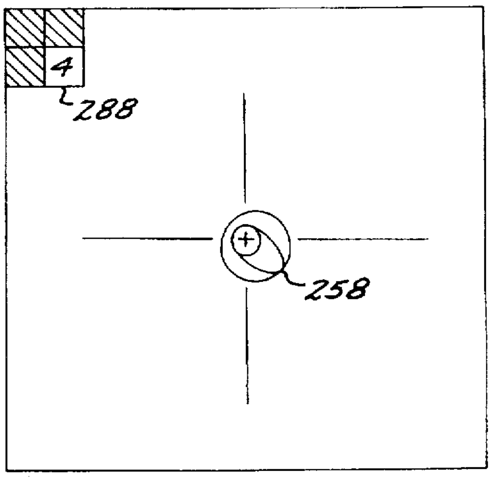

The preferred method proceeds by installing a second image bearing negative D' in the negative holder 34 at step 306, and re-setting the platen position by rotating the handwheel 170 to position marker "2" at step 306, which aligns the transparent apertures 208 over the second quadrant 284 of the respective four pixel groupings 20 to be exposed onto the film sheet 240. The image is then projected to expose the corresponding pixels of the second quadrant at step 310 as shown in FIG. 13. This procedure is repeated for the third and fourth exposures, as shown in FIGS. 14 and 15, to respectively align the transparent apertures over the respective third 286 and fourth quadrants 288 to expose corresponding pixels onto the sheet of film. Following the final exposure, the film is removed and developed 314 to become a usable mosaic transparency 17 (FIG. 1).

It will be appreciated that the mosaic fixture of the present invention is economical to manufacture and economical to use. Used in the method detailed above it is effective to efficiently create a transparency comprising a composite of multiple independent images which, when employed within an appropriate display device, will present a sequential display pleasing to the eye and free from white flash.

While a preferred embodiment of the invention has been illustrated and described, it is within the scope of this invention to provide a fixture capable of creating mosaics made up of pixels having the form of pentagons, hexagons or any other polygonal configuration arranged in groups to define within each group an endless path of circular elliptical or other circularly shaped configuration.

The straightforward operating procedure for using the present invention, enables a mosaic transparency manufacturer to reap the benefits of increased productivity through mass production. Additionally, being of a unitized, modular nature, the mosaic fixture of the present invention serves to increase the flexibility of a mosaic transparency production line by providing a separate, removable, replaceable unit that allows for alternatives in mosaic fixture designs and capabilities.

From the foregoing, it will be appreciated that the mosaic fabrication fixture and method of the present invention provides an efficient, low cost means of exposing film sheets to produce high quality mosaic transparencies. Due to its straightforward user friendly design, the fixture may be employed in a high volume production environment to minimize production costs. In addition, the fixture's modularity maximizes a factory's flexibility.

What is claimed is:

1. A mosaic transparency fixture for exposing a single photosensitive film sheet to produce a transparency formed by a plurality of independent images, each formed by spaced apart groups of a selected number of predetermined sized pixels interlaced with and spaced from one another to, in each group form a common pattern with corresponding pixels of each said group correspondingly located and the corresponding pixels of each group disposed at selected index points along a predetermined curved endless path, said fixture including:

a horizontally disposed base plate;

a floating platen overlying said base plate and formed with an upwardly facing film support surface for mounting said sheet, said platen arranged for orbiting about a platen path having a plurality of index points corresponding with said predetermined curved path;

a multi axis suspension system interposed between said base plate and platen and supporting said platen for free travel about said path;

a control device coupled between said base plate and platen for controlling movement of said platen about said path to define a platen path and including an index device operative in response to said platen moving to said index points in said platen path corresponding with the respective said selected points in said predetermined curved path to releasably hold said platen at the respective said selected points;

a drive device coupled with said control device and operative to, upon manipulation thereof, drive said platen through said platen path; and a substantially opaque exposure mask mounted on said base plate overlaying said film support surface and formed with a pattern corresponding with the location and size of said selected number of predetermined sized pixels and including transparent apertures repetitively interlaced in said pattern corresponding with the correspondingly located pixel of each said group.

2. A mosaic transparency fixture according to claim 1 wherein:

said control device includes an eccentric cam for controlling movement of said platen through a circular path.

3. A mosaic transparency fixture according to claim 1 wherein:

said base plate includes a plurality of index indents spaced equidistant about a pivot point;

said index device includes a wheel rotatably mounted on said base plate for rotation about said pivot point and mounting a detent device including a detent ball selectively and releasably registerable with said indents to, at each said registration releasably hold said platen at a respective one of said index points.

4. A mosaic transparency fixture according to claim 1 that includes:

a cover hingedly connected along one side to said base plate and mounting said exposure mask.

5. A mosaic transparency fixture according to claim 1 wherein:

said control device includes a flywheel pivotally mounted on said base plate, an eccentric cam mounted on said flywheel, a handwheel mounted on said base plate spaced from said flywheel and a drive belt coupled between said flywheel and handwheel.

6. A mosaic transparency fixture according to claim 5 wherein:

said drive belt is in the form of a toothed timing belt.

7. A mosaic transparency fixture according to claim 5 that includes:

a catch element mounted on said base plate;

a latch device mounted on said cover, including a latch releasably engageable with said catch element and a handle operable to selectively engage said latch with said catch element.

8. A mosaic transparency fixture according to claim 1 wherein:

said suspension system includes an intermediate table and linear bearing assemblies interposed above and below said intermediate table and disposed orthogonal to one another.

9. A mosaic transparency fixture according to claim 1 that includes:

stand posts mounted about the periphery of said platen, tubular caps received telescopically over said stand posts and carrying said platen and coil compression springs telescoped over the respective stand posts and interposed between said caps and base plate to bias said caps upwardly.

10. A mosaic transparency fixture according to claim 1 wherein:

said suspension system includes a table interposed between said base plate and platen and formed with a central clearance opening and linear bearing assemblies interposed respectively above and below said table and said control device includes a bearing assembly mounted on said base plate and projecting upwardly through said opening and an eccentric bearing carried by said bearing assembly and coupled with said platen to, upon rotation of said bearing assembly, orbit said platen about said platen pattern.

11. A mosaic transparency fixture according to claim 1 for use in exposing said film sheet to produce said groups with said pixels arranged in a square pattern and wherein:

said control device includes a beating assembly mounted on said base plate for rotating about a vertical central axis, an eccentric cam mounted on said bearing assembly and coupled with said platen to, upon rotation of said bearing assembly, drive said platen through said platen path, a flywheel mounted concentrically on said bearing assembly, a handwheel spaced from said bearing assembly, a drive belt coupled between said flywheel and handwheel and wherein:

said index device includes a detent and ball assembly interposed between said handwheel and said base plate and including detents formed in said base equidistant about the pivot axis of said handwheel and a biased ball mounted in said handwheel for releasably engaging said detents to releasably hold said handwheel in selected positions to selectively hold said platen indexed at the respective said index points.

12. A mosaic transparency registration system for exposing a single photo-sensitive film sheet to produce a transparency having a composite of independent images formed by sequentially dwelling said sheet at selected points along a predetermined circular path beneath an exposure light source, said system including:

a horizontally disposed base plate;

a floating platen overlying said base plate and formed with an upwardly facing film support surface for mounting said sheet, said platen arranged for orbiting about a platen path corresponding with said predetermined circular path;

a multi axis suspension system interposed between said base plate and platen and supporting said platen for free travel about said path;

a control device couple between said base plate and platen for controlling movement of said platen about said path and including an index device operative in response to said platen moving to index points in said platen path corresponding with the respective said selected points in said predetermined circular path to releasably hold said platen at the respective said selected points;

a drive device coupled with said control device and operative to, upon manipulation thereof, drive said platen through said platen path; and an opaque exposure mask mounted on said base plate overlaying said film support surface and formed with a pattern of transparent apertures to selectively pass said exposure light therethrough for selectively exposing portions of said film sheet corresponding with the location and relative orientation of said composite of independent images.

13. A method of making a mosaic transparency of a plurality of independent images, each formed by spaced apart groups of a selected number of predetermined sized pixels interlaced with and spaced from one another to, in each group, form a common pattern with corresponding pixels of each said group correspondingly located and the pixels of each group disposed at selected points along a predetermined pixel path, said method including the steps of:

selecting a photo sensitive film;

selecting an apparatus having a floating platen and a fixed mask overlayed thereon, said mask having transparent apertures in a predetermined pattern corresponding to said predetermined pixel path, said platen being coupled to a drive device to sequentially steer said platen through an orbital path having fixed indexed points corresponding to said predetermined pixel path for aligning said film relative to said mask;

mounting said film fixedly to said platen in an interposed relationship between said platen and said mask;

moving said platen sequentially through said orbital path to each of said selected index points and stopping said platen sequentially thereat;

selecting a subject image to be reproduced at each said index point and projecting exposure light from a light source upon said image, through said apertures in said mask to expose a plurality of corresponding pixels on said film; and removing and developing said exposed film upon completion of said predetermined orbital path.

14. The method as recited in claim 13 and including the step of:

spacing said light source and said apparatus a sufficient distance apart to diverge said light a predetermined angle relative to said light axis wherein said apertures are of a size sufficient to guide and condition said light therethrough such that said pixels exposed onto said film impinge upon the proximate perimeters of other of said pixels.

15. The method as recited in claim 13 wherein:

said predetermined path is a circular orbit with said index points spaced radially in four quadrants corresponding to dwell positions of 45, 315, 225 and 135 degrees.

16. The method as recited in claim 13 wherein:

said orbital path positions said apertures such that adjacent edges of said exposed pixels impinge upon previously exposed pixels resulting in double exposed pixel borders.

17. A method of making a mosaic transparency of a plurality of independent images, each formed by spaced apart groups of a selected number of predetermined sized pixels interlaced with and spaced from one another to, in each group, form a common pattern with corresponding pixels of each said group correspondingly located and the pixels of each group disposed at selected points along a predetermined pixel path, said method for use with an apparatus having a floating platen and a fixed mask overlayed thereon, said mask having transparent apertures in a predetermined pattern corresponding to said predetermined pixel path, said platen being coupled to a drive device to sequentially steer said platen through an orbital path having fixed indexed points corresponding to said predetermined pixel path for aligning said film relative to said mask, said method including the steps of:

selecting a photo sensitive film;

mounting said film fixedly to said platen in an interposed relationship between said platen and said mask;

moving said platen sequentially through said orbital path to each of said selected index points and stopping said platen sequentially thereat;

selecting a subject image to be reproduced at each said index point and projecting exposure light from a light source upon said image, through said apertures in said mask to expose a plurality of corresponding pixels on said film; and removing and developing said exposed film upon completion of said predetermined orbital path.

18. A mosaic transparency fixture for exposing a single photo-sensitive film sheet to produce a transparency formed by a plurality of independent images, each formed by spaced apart groups of a selected number of predetermined sized pixels interlaced with and spaced from one another to, in each group form a common pattern with corresponding pixels of each said group correspondingly located and the corresponding pixels of each group disposed at selected points along a predetermined curved endless path, said fixture including:

a horizontally disposed base plate;

a floating platen overlying said base plate and formed with an upwardly facing film support surface for mounting said sheet, said platen arranged for orbiting about a circular path having a plurality of index points corresponding with said predetermined curved path;

a multi axis suspension system interposed between said base plate and platen and supporting said platen for free travel about said circular path;

a control device coupled between said base plate and platen and including an eccentric cam for controlling movement of said platen about said circular path and including an index device operative in response to said platen moving to said index points in said circular path corresponding with the respective said selected points in said predetermined curved path to releasably hold said platen at the respective said selected points;

a drive device coupled with said control device and operative to, upon manipulation thereof, drive said platen through said circular path; and a substantially opaque exposure mask mounted on said base plate overlaying said film support surface and formed with a pattern corresponding with the location and size of said selected number of predetermined sized pixels and including transparent apertures repetitively interlaced in said pattern corresponding with the correspondingly located pixel of each said group.

19. The mosaic transparency fixture of claim 18 wherein:

said base plate includes a plurality of index indents spaced equidistant about a pivot point; and said index device includes a wheel rotatably mounted on said base plate for rotation about said pivot point and mounting a detent device including a detent ball selectively and releasably registerable with said indents to, at each said selected point, releasably hold said platen at a respective one of said index points.

20. The mosaic transparency fixture of claim 18 wherein:

said control device includes a flywheel pivotally mounted on said base plate, a handwheel mounted on said base plate spaced from said flywheel and a drive belt coupled between said flywheel and handwheel and wherein:

said eccentric cam is mounted on said flywheel.

21. The mosaic transparency fixture of claim 20 wherein:

said drive belt is in the form of a toothed timing belt.

22. The mosaic transparency fixture of claim 20 that includes:

a catch element mounted on said base plate; and a latch device mounted on said cover, including a latch releasably engageable with said catch element and a handle operable to selectively engage said latch with said catch element.

23. The mosaic transparency fixture of claim 18 that includes:

stand posts mounted about the periphery of said platen, tubular caps received telescopically over said stand posts and carrying said platen and coil compression springs telescoped over the respective said stand posts and interposed between said caps and base plate to bias said caps upwardly.

24. The mosaic transparency fixture of claim 18 wherein:

said suspension system includes a table interposed between said base plate and platen and formed with a central clearance opening and linear bearing assemblies interposed respectively above and below said table; and said control device includes a bearing assembly mounted on said base plate and projecting upwardly through said opening and an eccentric bearing carried by said bearing assembly and coupled with said platen to, upon rotation of said bearing assembly, orbit said platen about said circular path.

25. The mosaic transparency fixture of claim 18 for use in exposing said film sheet to produce said groups with said pixels arranged in a square pattern and wherein:

said control device includes a bearing assembly mounted on said base plate for rotating about a vertical central axis, an eccentric cam mounted on said bearing assembly and coupled with said platen to, upon rotation of said bearing assembly, drive said platen through said circular path and further including:

a flywheel mounted concentrically on said bearing assembly, a handwheel spaced from said bearing assembly, and a drive belt coupled between said flywheel and handwheel and wherein:

said index device includes a detent and ball assembly interposed between said handwheel and said base plate and including detents formed in said base equidistant about the pivot axis of said handwheel and a biased ball mounted in said handwheel for releasably engaging said detents to releasably hold said handwheel in selected positions to selectively hold said platen indexed at the respective said index points.

26. A method of making a mosaic transparency of a plurality of independent images, each formed by spaced apart groups of a selected number of predetermined sized pixels interlaced with and spaced from one another to, in each group, form a common pattern with corresponding pixels of each said group correspondingly located and the pixels of each group disposed at selected points along a predetermined circular orbital path, said method including the steps of:

selecting a photo sensitive film;

selecting an apparatus having a floating platen and a fixed mask overlaid thereon, said mask having transparent apertures in a predetermined pattern corresponding to said predetermined circular orbital path, said platen being coupled to a drive device to sequentially steer said platen through a platen path having fixed indexed points spaced radially in four quadrants corresponding to said predetermined circular orbital path for aligning said film relative to said mask;

mounting said film fixedly to said platen in an interposed relationship between said platen and said mask;

moving said platen sequentially through said circular orbital path to each of said selected index points and stopping said platen sequentially thereat;

selecting a subject image to be reproduced at each said index point and projecting exposure light from a light source upon said image, through said apertures in said mask to expose a plurality of corresponding pixels on said film; and removing and developing said exposed film upon completion of said predetermined circular orbital path.

* * * * *

UNITED STATES PATENT AND TRADEMARK OFFICE

CERTIFICATE OF CORRECTION

PATENT NO. : 5,638,156

DATED : June 10, 1997

INVENTOR(S) : Hans J. Dehli

It is certified that error appears in the above-identified patent and that said Letters Patent is hereby corrected as shown below:

Column 12, line 1, delete "beating" and insert --bearing--.

Signed and Sealed this

Sixteenth Day of September, 1997

Attest:

BRUCE LEHMAN

*Attesting Officer*

*Commissioner of Patents and Trademarks*